Nov. 6, 1951    A. H. PFUND    2,573,870

MANOMETRIC GAS DETECTOR

Filed March 4, 1948

Inventor
AUGUST H. PFUND

By [signature]
Attorney

Patented Nov. 6, 1951

2,573,870

UNITED STATES PATENT OFFICE 2,573,870

MANOMETRIC GAS DETECTOR

August H. Pfund, Baltimore, Md., assignor to United States of America as represented by the Secretary of the Navy Application March 4, 1948, Serial No. 13,060

7 Claims. (Cl. 250—43)

This invention relates to a sensitive manometric gas detector cell whose principle of operation is based upon the thermal expansion of gas contained within the cell. In particular the invention relates to a detector cell containing the gas to be detected which cell is sensitive to the thermal expansion of this gas induced by infrared ray absorption.

It is known in the art how to detect the presence of particular gases both qualitatively and quantitatively by means of infrared ray absorption. The particular wavelength absorbed and quantity absorbed are used to indicate the gas present and the quantity thereof. Reference is here made to the applicant's patent, Serial No. 2,212,211, issued August 20, 1940, and to the patent to Schmick, Serial No. 1,758,088, issued May 13, 1930, both of which disclose different types of apparatus for determining the amount of infrared absorption by a particular gas and consequently the quantity of that gas present. The apparatus of neither one of these patents is as sensitive as that of the applicant's present invention.

The general theory of infrared absorption by a gas is that a molecule, composed of two or more unlike atoms usually has an asymmetrical charge distribution. Such a molecule is called a polar molecule or a dipole. Some gases, $CO_2$ for example, are not normally dipolar but become asymmetrical and thus dipolar when vibrating. According to classical electrodynamics, any motion of an atomic system that is connected with a change of its dipole moment leads to an absorption or emission of radiation. For instance, during the vibrational motion of a molecule the charge distribution undergoes a periodic change, and therefore in general the dipole moment changes periodically. This periodic motion can be resolved into a sum of simple periodic or normal vibrations, and the frequencies corresponding to these normal vibrtions are the frequencies absorbed (or emitted) by the molecule. Homoatomic gases such as $H_2$, $O_2$, and $N_2$ do not possess dipole moments even when vibrating, hence possess no such absorption characteristics.

These absorption frequencies lie in the near infrared spectrum. The infrared spectrum is that region of the electromagnetic spectrum which lies between the red end of the visible spectrum (wavelength 0.8 micron) and the ultrashort radio waves (1000 microns). The absorption frequencies described above lie in the region of the spectrum between 1 and 25 microns. The reason for the existence of these absorption frequencies or bands, as they are called, can be made clear by a mechanical example.

Consider a system of massive balls (the atoms) connected by a system of springs (the chemical bonds, i. e. the force constants of the vibrating atoms). Such a system exhibits resonance phenomena, i. e. when an external driving force (source of radiation) excites the mechanical system, the latter will be set in vibration and absorb energy from the external source if the frequency of excitation corresponds to one or more of the resonant frequencies which are characteristic of the system. The mass of the balls and the strength of the springs provide sufficient data for a determination of the resonant frequency on the theory of classical mechanics. Analogously, the mass of the atoms and the force constants of the vibrating atoms are all the data required to determine the molecular frequency on the basis of quantum mechanics. One other factor which enters into the calculation is the amount of damping or resistance to vibrations. Damping broadens the bands. Since gas molecules are free to vibrate, the bands are very narrow. The result of these factors is that when infrared rays pass through space containing dipole gases, each gas absorbs rays of frequencies corresponding to its resonant frequencies; the radiation leaving the space is deficient in these regions, and the absorbing molecules are set in vibration. The energy which the molecules absorb is dissipated as mechanical energy, the net result being that the gas is heated slightly. The facts contained in the last three sentences are those upon which the methods of gas detection are based.

As pointed out above, homoatomic gases do not possess dipole moments and therefore do not possess infrared absorption bands. Therefore the measurement of any dipole gas in air can be made without interference from oxygen or nitrogen. Since the frequency (or wavelength) at which a gas absorbs infrared rays is dependent upon the mass of the atoms of which the gas molecule is composed and the nature of the bonds between the atoms, different gases will have absorption bands in different regions of the spectrum. Thus CO, $CO_2$, and water vapor have absorption bands which are completely separated from each other. This is a necessary condition for obtaining accurate selectivity (detection of one gas in the presence of other components). Gases with identical bonds possess identical absorption bands. Thus all hydrocarbon gases absorb at the same wavelength because of the C—H vibration. Selective detection of one hydrocarbon in the presence of another is possible, however, if the gases possess other bands due to different bonds and if the region of the spectrum in which the overlapping bands occur can be removed by filters. There are many gases which do not have identical bonds but which nevertheless possess absorption bands which overlap to a greater or less extent. An example is methane, which absorbs slightly at 4.4 microns, the wavelength at which carbon dioxide absorbs very strongly. In such cases the degree of selectivity is limited.

Having in mind the above theory of infrared ray absorption by gas molecules it is the general object of applicant's invention to provide a gas detector cell which is highly selective.

It is also an object of the invention to provide a gas detector which by reason of the differential effect of the absorption of infrared rays by a mixture of gases free of the gas being detected and a mixture of gases containing the gas being detected manifests the increased absorption by the gas being detected by a lesser movement of a flexible element in the detector cell.

It is a further object of the invention to provide a gas detector in which the unabsorbed infrared rays are reflected out of the detector cell and so exert no heating effect on the gas therein contained.

It is a still further object of the invention to provide a gas detector cell which is not only highly selective and sensitive to infrared ray absorption but is also accurate qualitatively and quantitatively.

These and other objectives will be apparent from the following description and from the accompanying drawings which are illustrative of a preferred embodiment of applicant's detector cell.

In these drawings—

Figure 1:
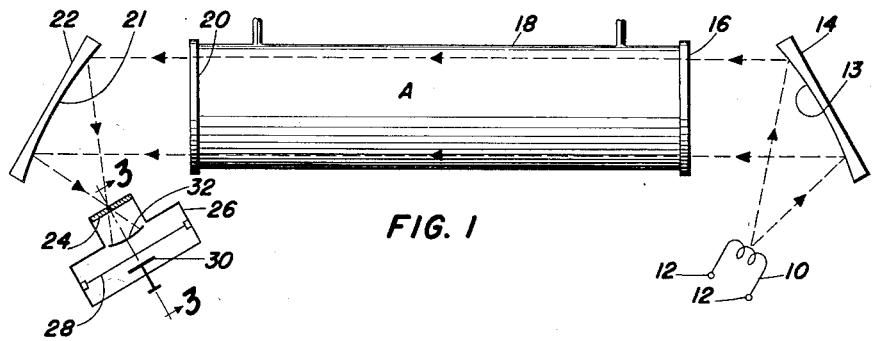
Fig. 1 is a digrammatic plan showing the optical relationship of the detector cell to the analyzer tube and the source of infrared rays.
Figure 2:
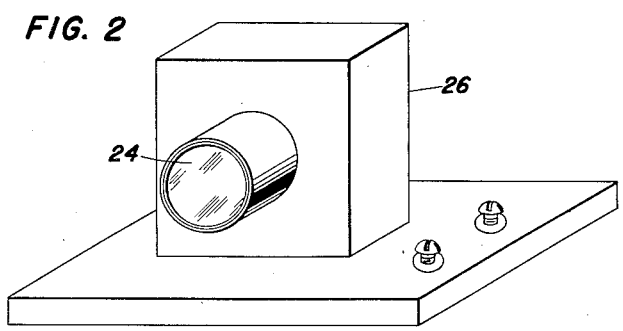
Fig. 2 is an isometric view of the detector cell.
Figure 3:
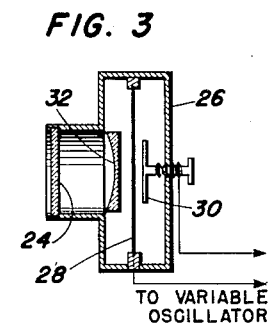
Fig. 3 is a longitudinal, vertical section of the detector cell taken on line 3—3 of Fig. 1.
Figure 4:
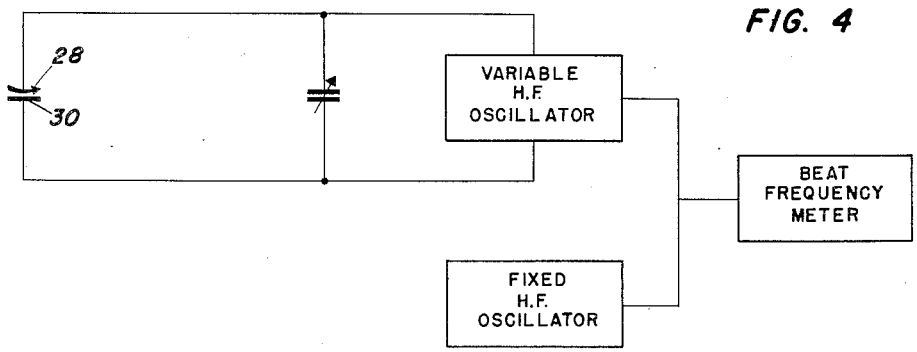
Fig. 4 is an electrical diagram showing the oscillating circuits used in conjunction with the detector cell.

In the drawings, 10 represents a source of infrared rays. This source may be a nichrome wire spiral which is adapted to be rendered incandescent by means of an electrical current the terminal connections to which are indicated at 12. The infrared rays generated by source 10 strike upon the concave face 13 of mirror 14 and are reflected in parallel therefrom through window 16 of analyzer tube 18. The rays pass from this tube out through window 20 striking upon concave face 21 of mirror 22. This mirror focuses the rays on window 24 of detector cell 26. The rays diverge from this focus to the interior of the cell. This cell is divided into two compartments by metallized diaphragm 28. The compartment extending between diaphragm 28 and window 24 is filled with the gas to be detected in analyzer tube 18. The unabsorbed infrared and other rays entering through window 24 are reflected out through window 24 by concave mirror 32. Plate 30, supported by threaded shaft 31 is mounted in the other compartment of detector 26 in a position relatively close to diaphragm 28. This plate and diaphragm constitute two plates of a capacitor whose operation is described below.

In the operation of the detector cell and associated optical components the only loss of energy in the radiation stream is by absorption by the gas in analyzer tube 18 and by absorption by the gas in the detector cell 26. Absorption by the gas in the detector cell causes heating of the gas which results in expansion and motion of diaphragm 28 which is electrically connected as one plate of a capacitor. As above stated the other capacitor plate is the normally fixed plate 30. This capacitor is part of an electrical circuit which transforms motion of the diaphragm into electrical signals. Under stable thermal conditions, with source radiation constant, no absorbing gas in the sample tube, 100 per cent of the gas to be detected (say $CO_2$) in the detector cell, the diaphragm is expanded to a maximum. Introduction of $CO_2$ in the sample tube removes some of the radiation, the gas in the detector cell cools, the diaphragm contracts and this motion is measured in the output meter of the electric circuit. The instrument can be calibrated by measuring the deflection caused by known samples and a calibration curve can be provided from the data so obtained.

Since the technique of transforming the position of the diaphragm into an electrical indication is well known, a detailed description thereof is not necessary, but a brief outline of the method is as follows. The circuit consists of two high frequency radio oscillators, one of fixed frequency, the other containing the diaphragm capacitor and an auxiliary adjustable capacitor, the frequency of this oscillator being controlled by the capacities (or plate separation) of these capacitors. Under stable oscillation the control capacitor may be adjusted so that the frequency of the two oscillators is the same. An auxiliary circuit (a beat frequency meter) measures the difference in frequency between the two oscillators. This is commonly known as a heterodyne action. Therefore, with no $CO_2$ in the sample tube, the circuit can be adjusted so that the output meter reads zero. When some $CO_2$ enters the sample tube, the gas in the detector cell does not receive as much 4.4 microns radiation, it cools, the diaphragm contracts which reduces the capacity of the capacitor in the detector cell.

This changes the frequency of the variable oscillator and causes the meter in the beat frequency circuit to deflect.

This type of detector cell is exceedingly sensitive. It can selectively measure a gas present in as low a proportion as five parts per million.

While the preferred embodiment of applicant's gas detector cell is that shown by the drawings it is not desired to be strictly limited thereto as variation in the construction of the cell and substitution of different types of the elements therein (such as a different type of flexible element for the diaphragm) can be made without departing from the spirit or scope of the invention. Such modifications are included to the extent defined by the herewith appended claims.

What is claimed is:

1. An apparatus for detecting the percentage present of molecularly dipolar gases comprising a source of infrared radiations of varied frequencies, a specimen absorption chamber adapted to receive a sample of gas for analysis in optical alignment with said source and provided with aligned windows for passage of said infrared radiations therethrough, a closed manometric detector cell disposed to receive the radiations through a window therein from said source through the said chamber, said cell being filled with a gas of the same type as that under test, movable means within said detector cell responsive to volumetric change of the gas therein due to absorption of said radiations, mirror means within said cell for reflecting the unabsorbed radiations from said source to the region without said window, a fixed plate positioned within said cell relatively close to said first named means adapted in conjunction with said means to provide a variable capacitor and a meter circuit connected to said capacitor and sensitive to capacity changes therein, whereby as the capacity of said capacitor is varied by the movement of said movable means electrical signals are produced in said circuit to indicate the relative quantity of the particular gas present in the specimen absorption chamber.

2. An apparatus for detecting the percentage present of molecularly dipolar gases comprising a source of infrared radiations of varied frequencies, a specimen absorption chamber adapted to receive a sample of gas for analysis in optical alignment with said source and provided with aligned windows for passage of said infrared radiations therethrough, a closed manometric detector cell disposed to receive the radiations through a window therein from said chamber, said cell being filled with a gas of the same type as that under test, a flexible metallized diaphragm within said detector cell responsible to volumetric change of the gas therein due to absorption of said radiations, a mirror within said cell for reflecting the unabsorbed radiations from said source to the region outside of said window, a fixed metallic plate positioned within said cell relatively close to said diaphragm adapted in conjunction with said diaphragm to provide a variable capacitor, and a meter circuit connected to said capacitor and sensitive to capacity changes therein, whereby as the capacity of the capacitor is varied by the movement of said diaphragm electrical indications are produced in said circuit to indicate the relative quantity of the particular gas present in the specimen absorption chamber.

3. A detector cell for use in detection of gases in a sampling chamber juxtaposed to said cell comprising a closed housing, a metallized flexible diaphragm in said housing adapted to divide the housing into two chambers, a window in said housing adapted to admit infrared radiations of varied frequencies passing through said sampling chamber into one of said cell chambers, a gas of the same type as the gas to be tested in said one chamber, a mirror positioned within said one chamber to reflect the unabsorbed radiations through the said window to a point outside said cell, a metallic plate positioned within the other chamber relatively close to said diaphragm to provide a variable capacitor, and a meter circuit connected to said capacitor and sensitive to capacity changes therein, whereby as the capacity of said capacitor is varied by the movement of said diaphragm with respect to said fixed plate electrical indications are produced in said circuit to indicate the relative quantity of the particular gas present in said sampling chamber.

4. In apparatus for detecting molecularly dipolar gases including a source of infra-red radiation of varied frequencies and an optically aligned chamber adapted to receive a sample of gas for analysis, a detector unit comprising a closed detector cell disposed to receive infra-red radiation through a window therein from said source through said chamber, said cell being filled with a gas of the same type as that under test, means within said detector cell for reflecting the unabsorbed radiations therefrom to a region external to said cell, a movable plate attached to and forming a section of the wall of said cell and movable through volumetric gas change in said cell, and a fixed plate positioned relatively close to said movable plate adapted in conjunction therewith to provide a variable capacitor, said capacitor being adapted for inclusion in an electrical meter circuit sensitive to capacity changes in said capacitor whereby, as the capacity of said capacitor is varied by the movement of said movable plate, electrical indications are produced in said meter to indicate the relative quantity of the particular gas present in the sample chamber.

5. Apparatus for detecting the precentage present of molecularly dipolar gases comprising a source of infrared radiation of varied frequencies, a specimen absorption chamber in optical alignment with said source adapted to receive a sample of gas for analysis and provided with aligned windows for passage of said infrared radiations therethrough and a thermal detector adapted to receive radiations transmitted through said chamber from said source, said detector comprising a closed cell, a chamber in said cell adapted to receive said radiations, a window in the chamber wall through which said radiations are transmitted, a mirror within the chamber normally reflecting through said window all radiation impacting thereon, a gas in said chamber of the same type as that under test, and capacitor means in said cell sensitive to the pressure developed by the heat of absorption of the residual infra-red rays in said cell chamber gas whereby the presence in said specimen chamber of a gas of the same type as that in said cell chamber is qualitatively indicated and quantitatively measured.

6. Apparatus for detecting the percentage present of molecularly dipolar gases comprising a source of infrared radiation of varied frequencies, a specimen absorption chamber in optical alignment with said source adapted to receive a sample of gas for analysis and provided with aligned windows for passage of said infrared radiations therethrough and a thermal detector adapted to receive radiations transmitted through said chamber from said source, said detector comprising a closed cell, a chamber in said cell adapted to receive said radiations, a window in the chamber wall through which said radiations are transmitted, a mirror within the chamber normally reflecting through said window all radiation impacting thereon, a gas in said chamber of the same type as that under test, a metal wall for said cell chamber movable with pressure changes of the cell chamber gas, and a fixed metal wall in parallel but displaced relationship to said movable wall, whereby an electric capacitor unit is formed adapted to vary the capacity on an electric circuit including said plates.

7. A detector cell for use in detection of gases in a sampling chamber juxtaposed to said cell comprising a closed housing, a metallized flexible diaphragm in said housing adapted to divide the housing into two chambers, a window in said housing adapted to admit infrared radiations of varied frequencies passing through said sampling chamber into one of said cell chambers, a gas of the same type as the gas to be tested in said one chamber, a concave mirror positioned within said one chamber, said mirror of such a radius of curvature as to reflect the unabsorbed radiations through the said window to a point outside said cell, a metallic plate positioned within the other chamber relatively close to said diaphragm to provide a variable capacitor, and a meter circuit connected to said capacitor and sensitive to capacity changes therein, whereby as the capacity of said capacitor is varied by the movement of said diaphragm with respect to said fixed plate electrical indications are produced in said circuit to indicate the relative quantity of the particular gas present in said sampling chamber.

AUGUST H. PFUND.

REFERENCES CITED

The following references are of record in the file of this patent:

UNITED STATES PATENTS

| Number | Name | Date |
|---|---|---|
| 1,975,516 | Nicolson | Oct. 2, 1934 |
| 2,212,211 | Pfund | Aug. 20, 1940 |
| 2,234,328 | Wolff | Mar. 11, 1941 |
| 2,327,539 | McAlister | Aug. 24, 1943 |
| 2,387,496 | Cornelius | Oct. 23, 1945 |
| 2,435,519 | Tolson | Feb. 3, 1948 |

OTHER REFERENCES

Abstract, by Eric Bradshaw, Journal of Scientific Instruments, June 1945.